(12) United States Patent
Hellier et al.

(10) Patent No.: US 10,580,210 B2
(45) Date of Patent: Mar. 3, 2020

(54) METHOD AND DEVICE FOR REFOCUSING AT LEAST ONE PLENOPTIC VIDEO

(71) Applicant: THOMSON Licensing, Issy-les-Moulineaux (FR)

(72) Inventors: Pierre Hellier, Thorigné fouillard (FR); Valerie Allie, Saint Armel (FR); Patrick Perez, Rennes (FR)

(73) Assignee: INTERDIGITAL CE PATENT HOLDINGS, Paris (FR)

( * ) Notice: Subject to any disclaimer, the term of this patent is extended or adjusted under 35 U.S.C. 154(b) by 0 days.

(21) Appl. No.: 16/063,273

(22) PCT Filed: Dec. 8, 2016

(86) PCT No.: PCT/EP2016/080285
§ 371 (c)(1),
(2) Date: Jun. 16, 2018

(87) PCT Pub. No.: WO2017/102549
PCT Pub. Date: Jun. 22, 2017

(65) Prior Publication Data
US 2018/0374263 A1   Dec. 27, 2018

(30) Foreign Application Priority Data
Dec. 16, 2015   (EP) .................................... 15307023

(51) Int. Cl.
*G06T 17/20* (2006.01)
*G06T 5/00* (2006.01)
*G06T 5/50* (2006.01)

(52) U.S. Cl.
CPC .............. *G06T 17/20* (2013.01); *G06T 5/003* (2013.01); *G06T 5/50* (2013.01); *G06T 2200/21* (2013.01);
(Continued)

(58) Field of Classification Search
CPC .......... G06T 17/20; G06T 5/003; G06T 5/50; G06T 2200/21; G06T 2200/10052; G06T 2200/10148
See application file for complete search history.

(56) References Cited

U.S. PATENT DOCUMENTS 8,531,581 B2   9/2013   Shroff et al.
8,619,177 B2   12/2013   Perwass et al.
(Continued)

FOREIGN PATENT DOCUMENTS

EP   2887642   6/2015

OTHER PUBLICATIONS

Guerra et al., "Plenoptics for Optical Wireless Sensor Networks", 2013 12th Workshop on Information Optics (WIO), Puerto de la Cruz, Spain, Jul. 15, 2013, pp. 1-3.
(Continued)

*Primary Examiner* — Antoinette T Spinks
(74) *Attorney, Agent, or Firm* — Patricia A. Verlangieri

(57) ABSTRACT

A method for refocusing, on at least one common point of interest, the rendering of one set of plenoptic video data provided by one plenoptic device belonging to a set of plenoptic devices capturing simultaneously a same scene. According to the present disclosure, said method comprises: obtaining (21) a common 3D reference system used for spatially locating said plenoptic device that has provided said set of plenoptic video data and at least one other device of said set of plenoptic devices, from said at least one common point of interest, determining (22) common refocusing plane parameters in said common 3D reference system, refocusing (23) the rendering of said set of plenoptic video data by converting (231) said common refocusing plane parameters into a rendering refocusing plane of a 3D reference system associated with said plenoptic device.

20 Claims, 7 Drawing Sheets

(52) U.S. Cl.
CPC ............... *G06T 2207/10052* (2013.01); *G06T 2207/10148* (2013.01)

(56) References Cited

U.S. PATENT DOCUMENTS

| | | | |
|---|---|---|---|
| 2010/0245355 A1* | 9/2010 | Chang | G06T 7/74 345/426 |
| 2010/0296724 A1* | 11/2010 | Chang | G06K 9/00208 382/154 |
| 2013/0222369 A1 | 8/2013 | Huston et al. | |
| 2013/0222633 A1 | 8/2013 | Knight et al. | |
| 2013/0322863 A1 | 12/2013 | Lee et al. | |
| 2014/0108526 A1 | 4/2014 | Garcia-Barrio et al. | |
| 2014/0177905 A1 | 6/2014 | Grefalda et al. | |
| 2014/0328535 A1* | 11/2014 | Sorkine-Hornung | G06T 5/00 382/154 |
| 2015/0058102 A1 | 2/2015 | Christensen et al. | |
| 2018/0288335 A1* | 10/2018 | Wang | H04N 5/23296 |

OTHER PUBLICATIONS

Arev et al., "Automatic Editing of Footage from Multiple Social Cameras", ACM Transactions on Graphics (TOG), vol. 33, No. 4, Jan. 1, 2014, pp. 1-11.

Bagri et al., "A Scalable Framework for Joint Clustering and Synchronizing Multi-Camera Videos", 21st European Signal Processing Conference (EUSIPCO 2013), Marrakech, Morocco, Sep. 9, 2013, pp. 1-5.

Hartley et al., Multiple View Geometry in Computer Vision, 2nd Edition, Cambridge University Press, 2003, pp. 1-673.

Ng et al., "Light Field Photography with a Hand-Held Plenopitc Camera", Stanford University, Computer Science Technical Report CTSR Feb. 2005, vol. 2, No. 11, Apr. 20, 2005, pp. 1-11.

Park et al., "3D Social Saliency from Head-mounted Cameras", 26th Annual Conference on Neural Information Processing Systems, Lake Tahoe, Nevada, USA, Dec. 3, 2012, pp. 422-430.

Pei et al., "A Novel Method for Detecting Occluded Object by Multiple Camera Arrays", 2012 9th International Conference on Fuzzy Systems and Knowledge Discovery (FSKD 2012), Sichuan, China, May 29, 2012, pp. 1673-1677.

Yang et al., "Simultaneous Active Camera Array Focus Plane Estimation and Occluded Moving Object Imaging", Image and Vision Computing, vol. 32, Aug. 2014, pp. 510-521.

Kovacs, J., "AN005 Application Note an Overview of Genlock", MicroImage Video Systems, https://www.mivs.com/documents/application-notes/an005-application-note/, Oct. 1, 2001, 2 pages.

Bishop et al., "Plenoptic Depth Estimation From Multiple Aliased Views", 2009 IEEE 12th international Conference on Computer Vision Workshops (ICCV Workshops), Kyoto, Japan, Sep. 27, 2009, 8 pages.

Douze et al., "Circulant Temporal Encoding for Video Retrievai and Temporal Alignment", Cornell University, Computer Science, Technical Paper arXiv:1506.02588v1, Jun. 8, 2015, pp. 1-15.

Le Meur et al., "A Coherent Computational Approach to Model Bottom-Up Visual Attention", IEEE Transactions on Pattern Analysis and Machine Intelligence, vol. 28, No. 5, May 2006, pp. 802-817.

Yilmaz et al., "Object Tracking: A Survey", ACM Computing Surveys, vol. 38, No. 4, Article 13, Dec. 2006, pp. 1-45.

Ester et al., "A Density-Based Algorithm for Discovering Clusters in Large Spatial Databases with Noise", 2nd International Conference on Knowledge Discovery and Data Mining (KDD-96), Portland, Oregon, USA, Aug. 2, 1996, 6 pages.

Comaniciu et al., "Mean Shift: A Robust Approach Toward Feature Space Analysis", IEEE Transactions on Pattern Analysis and Machine intelligence, vol. 24, No. 5, May 2002, pp. 603-619.

Dellaert et al., "Structure from Motion without Correspondence", IEEE Conference on Computer Vision and Pattern Recognition (CVPR 2000), Hilton Head, South Carolina, USA, Jun. 13, 2000, 8 pages.

\* cited by examiner

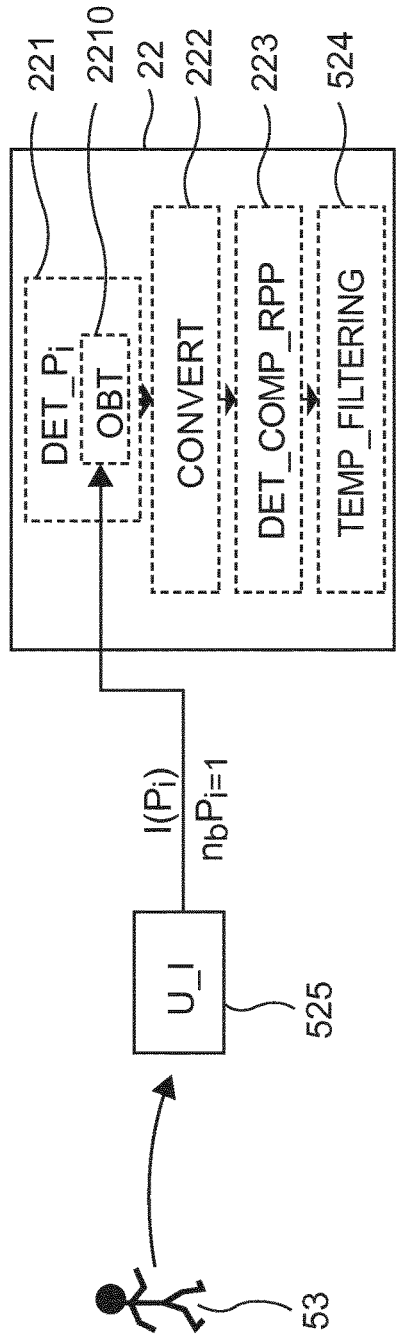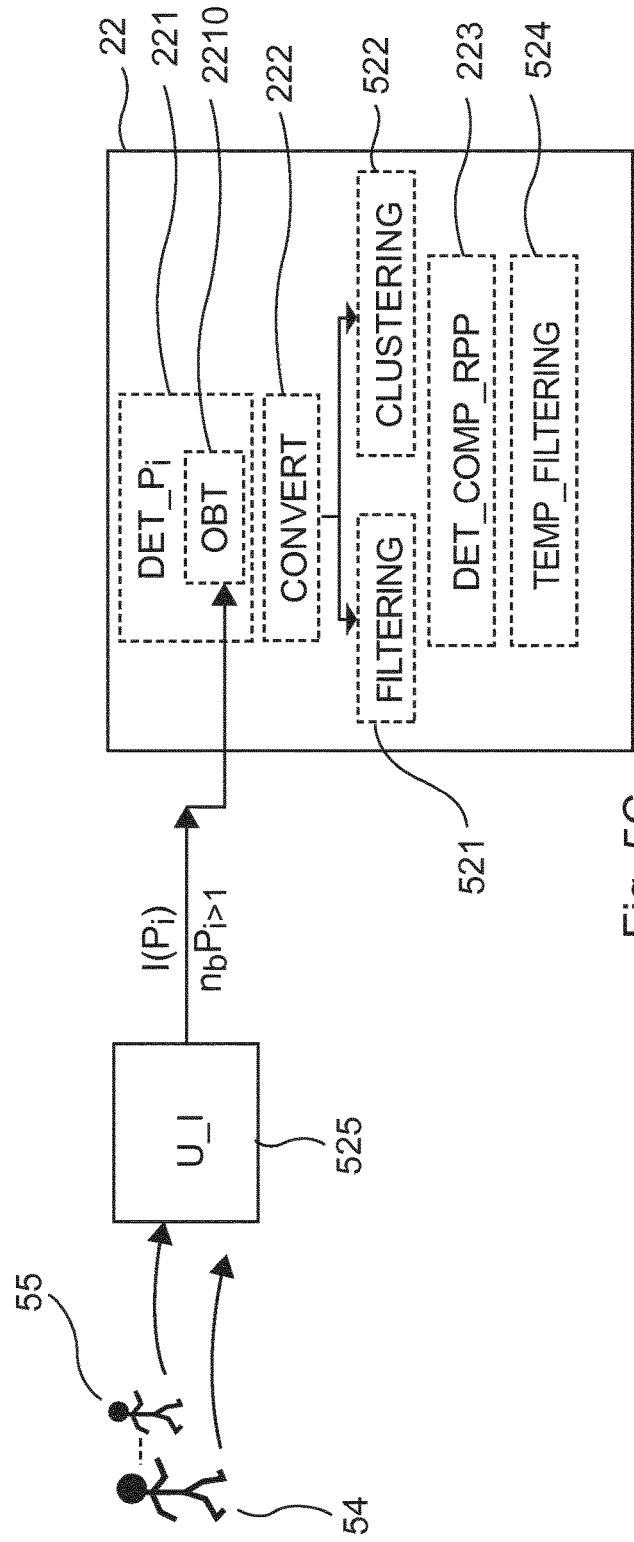

METHOD AND DEVICE FOR REFOCUSING AT LEAST ONE PLENOPTIC VIDEO

This application claims the benefit of International Application PCT/EP2016/080285, under 35 U.S.C. § 365, filed on Dec. 8, 2016, which was published in accordance with Article 21(2) on Jun. 22, 2017, in English, and which claims priority to European Patent Application No. 15307023.0 filed Dec. 16, 2015.

1. TECHNICAL FIELD

The present disclosure relates to light field imaging, and to technologies for acquiring and processing light field data. More precisely, the present disclosure generally relates to a method and a module for refocusing at least one plenoptic device belonging to a plurality of plenoptic devices capturing a same scene, and finds applications in the domain of social media applications.

2. BACKGROUND ART

This section is intended to introduce the reader to various aspects of art, which may be related to various aspects of the present disclosure that are described and/or claimed below. This discussion is believed to be helpful in providing the reader with background information to facilitate a better understanding of the various aspects of the present principles. Accordingly, it should be understood that these statements are to be read in this light, and not as admissions of prior art.

Conventional image capture devices render a three-dimensional scene onto a two-dimensional sensor. During operation, a conventional capture device captures a two-dimensional (2-D) image representative of an amount of light that reaches a photosensor (or photodetector) within the device. However, this 2-D image contains no information about the directional distribution of the light rays (that defines the light fields) that reach the photosensor. Depth, for example, is lost during the acquisition. Thus, a conventional capture device does not store most of the information about the directional light distribution from the scene.

Light field capture devices (also referred to as "light field data acquisition devices") have been designed to measure a four-dimensional (4D) light field of the scene by capturing the light from different viewpoints of that scene. Thus, by measuring the amount of light traveling along each beam of light that intersects the photosensor, these devices can capture additional optical information (information about the directional distribution of the bundle of light rays) for providing new imaging applications by post-processing. The information acquired/obtained by a light field capture device is referred to as the light field data. Light field capture devices are defined herein as any devices that are capable of capturing light field data. There are several types of light field capture devices, among which:
- plenoptic devices, which use a microlens array placed between the image sensor and the main lens, as described in document US 2013/0222633;
- a camera array, where each camera images onto its own image sensor.

The light field data may also be simulated with Computer Generated Imagery (CGI), from a series of 2-D images (called views when two differing images representative of a same scene are captured with different viewing points) of a same scene each taken from a different viewpoint by the use of a conventional handheld camera.

Light field data processing comprises notably, but is not limited to, generating refocused images of a scene, generating perspective views of a scene, generating depth maps of a scene, generating extended depth of field (EDOF) images, generating stereoscopic images, and/or any combination of these.

The present disclosure focuses more precisely on light field based image captured by a plenoptic device as illustrated by FIG. 1 and disclosed by R. Ng, et al. in "*Light field photography with a hand-held plenoptic camera*" *Standford University Computer Science Technical Report CSTR* 2005-02, no. 11 (April 2005).

Such plenoptic device is composed of a main lens (11), a micro-lens array (12) and a photo-sensor (13). More precisely, the main lens focuses the subject onto (or near) the micro-lens array. The micro-lens array (12) separates the converging rays into an image on the photo-sensor (13) behind it.

State of Arts methods for enriching the video capture experience provided by a plurality of users, as described in US20130222369 consists in the manually selection of a point of interest made by one user of the plurality of users, for example by collecting users feedback.

Then, according to the prior art, each user selects manually through their own device the corresponding point of interest and focus is computationally made on a plane perpendicular to the optical axis of each device passing through this object.

However, such methods of the prior art are not able to take into account the specificities of light field imaging (aka plenoptic data), which records the amount of light (the "radiance") at some points in space, in some directions. Indeed, such conventional video capture device delivers conventional imaging formats.

It would hence be desirable to provide a technique for exploiting the plurality of views provided by a plurality of plenoptic devices that would not show these drawbacks of the prior art. Notably, it would be desirable to provide such a technique, which would allow a finer rendering of objects of interest of video obtained from light field based images.

3. SUMMARY

The following presents a simplified summary of the disclosure in order to provide a basic understanding of some aspects of the disclosure. This summary is not an extensive overview of the disclosure. It is not intended to identify key or critical elements of the disclosure. The following summary merely presents some aspects of the disclosure in a simplified form as a prelude to the more detailed description provided below.

The disclosure sets out to remedy at least one of the drawbacks of the prior art with a method for refocusing, on at least one common point of interest, the rendering of one set of plenoptic video data provided by one plenoptic device belonging to a set of plenoptic devices capturing simultaneously a same scene.

Such refocusing method comprises:
- obtaining a common 3D reference system used for spatially locating said plenoptic device that has provided said set of plenoptic video data and at least one other device of said set of plenoptic devices,
- from said at least one common point of interest, determining common refocusing plane parameters in said common 3D reference system,
- refocusing the rendering of said set of plenoptic video data by converting said common refocusing plane parameters into a rendering refocusing plane of a 3D reference system associated with said plenoptic device that has provided said set of plenoptic video data, said converting using a transformation between said common 3D reference system and said 3D reference system associated with said plenoptic device.

The present disclosure thus relies on a novel and inventive approach for refocusing on at least one common point of interest, the rendering of one set of plenoptic video data, provided by one plenoptic device (i.e. plenoptic camera) belonging to a set of plenoptic devices capturing simultaneously a same scene, by taking into account at least one other plenoptic device of said set of plenoptic devices.

In other words, the obtained rendering refocusing of one set of plenoptic video data provided by one plenoptic device of a set of plenoptic devices cannot be obtained without considering common refocusing plane parameters also associated with one other plenoptic device belonging to said set of plenoptic devices capturing simultaneously a same scene.

Thus, the obtained rendering refocusing associated with one plenoptic device of a set of plenoptic devices depends on at least one other plenoptic device belonging to said set of plenoptic devices. As a result, the present disclosure ensures consistency of focal planes among the different plenoptic devices and provides enriched information to define the best focal plane for each set of plenoptic video data to render.

By "set of plenoptic video data", it is considered that each plenoptic device of said set of plenoptic devices provides one set of plenoptic video data of a same scene captured simultaneously by all the plenoptic devices of said set of plenoptic devices. Said set of plenoptic video data is a content corresponding for example to a whole video film, a part of a video film (or in other words a sequence corresponding to a set of successive frames of a whole video film) such as one song during a video of a concert, or a frame, or a part of a frame, etc.

As a consequence, contrary to the methods of the prior art where the refocusing of each shared set of plenoptic video data is processed individually, the present disclosure provides automatically (i.e. without any interaction of a user during the steps of obtaining, determining and refocusing respectively) in a common 3D reference system for all the involved plenoptic devices, common refocusing plane parameters, which are then used for the rendering of each set of plenoptic video data, for which it is aimed to change the refocusing plan.

The present disclosure is thus particularly interesting in a "social context", where multiple people shoot a public or private event (sport, street concert, party, etc.), using all a plenoptic device (i.e. a camera). Indeed, the present disclosure benefits from the multi-view plenoptic content provided by the plurality of plenoptic devices.

In addition, the present disclosure exploits the refocusing capability of the plenoptic devices for refocusing, contents to render, on a refocusing plane that is, according to the present disclosure, mutually determined for a part or for all plenoptic devices involved in the "social" sharing of plenoptic contents.

In other words, the present disclosure provides a solution for sharing refocusing plane parameters among the involved plenoptic devices. As a result, the obtained rendering refocusing plane is not necessarily, as in the prior art, a plane perpendicular to the optical axis of the plenoptic device that has captured the plenoptic video data set to render, but a refocusing plane obtained from refocusing plane parameters common for all the involved plenoptic devices.

Such a processing provided by the present disclosure could be real time performed during the capturing of the sets of plenoptic video data, or later during their later rendering.

Thus, the present disclosure enriches the video capture experience provided by multi plenoptic devices by providing a rendering refocusing plane jointly determined in a common 3D reference system for the set of plenoptic devices that simultaneously capture a same scene.

According to a particular aspect of said disclosure, plenoptic video data sets provided respectively by said plenoptic device and said at least one other device of said set of plenoptic devices are previously temporally synchronised during or after their acquisition.

In other words, prior to the main steps of obtaining, determining and refocusing of the present disclosure, it is assumed that the pieces of content provided by the plenoptic devices are temporally synchronized.

This can be performed either using a generator locking for temporally synchronising plenoptic video data sets provided respectively by said plenoptic device and said at least one other device of said set of plenoptic devices during their acquisition. The generator locking, also known as "genlock" is for example described by J. Kovacs in "*An Overview of Genlock*", Application Note No. 5, Microimage Video Systems.

Alternatively, said temporal synchronisation can be preformed using a post-acquisition synchronisation technique wherein a temporal alignment based on image and/or audio patterns is performed.

A. Bagri et al. in "*A scalable framework for joint clustering and synchronizing multi-camera videos*", IEEE Proceeding of the 21$^{st}$ European Signal processing Conference (EUSIPCO) (pp 1-5), 2013, discloses an example of such a temporal synchronisation based on audio pattern temporal alignment, whereas M. Douze et al. in "*Circulant temporal encoding for video retrieval and temporal alignment*" Computer Vision and pattern recognition, June 2015, arXiv: 1506.02588, discloses an example of a visual mode wherein such a temporal synchronisation is based on image pattern temporal alignment.

Thus, the present disclosure proposes to use these methods of temporal synchronisation in a particular context corresponding to the determining of common refocusing plane parameters shared between at least two plenoptic devices of a set of plenoptic devices.

According to a particular aspect, obtaining a common 3D reference system comprises using structure-from-motion for determining 3D poses respectively for at least said plenoptic device that has provided said set of plenoptic video data and for said at least one other device of said set of plenoptic devices. F. Dellaert et al. discloses in "*Structure from Motion without Correspondence*" IEEE Computer Society Conference on Computer Vision and Pattern Recognition April 2000 what is considered as a "structure-from-motion" according to the present disclosure.

More precisely, structure-from-motion allows through optimization techniques the joint estimation of 3D structures of imaged scene (point cloud computation via triangulation, which represents the scene) and of the 3D pose of each plenoptic device with respect to the common 3D reference system where point cloud is defined.

It has to be noted that F. Dellaert et al. does not disclose the use of structure-from-motion in the particular context of the present disclosure aiming at determining of common refocusing plane parameters shared between at least two plenoptic devices of a set of plenoptic devices.

According to another particular aspect of said disclosure, said refocusing is recomputed when a distance between said rendering refocusing plane and the plane perpendicular to an optical axis of said plenoptic device that has provided said set of plenoptic video data, exceeds a predetermined value.

For example, said distance is obtained by determining the scalar product between, on the one hand, the optical axis of the considered plenoptic device, and on the other hand the vector orthogonal to the rendering refocusing plane obtained according to the present disclosure for the set of plenoptic video data provided by said considered plenoptic device.

The predetermined value can be a system value or a user value set, for instance, thanks to a specific user interface allowing the user to select his preferences.

According another particular aspect of the present disclosure, said determining of common refocusing plane parameters in said common 3D reference system comprises:
- determining of said at least one common point of interest by obtaining information representative of at least one point of interest associated with at least one plenoptic video data set of interest provided by at least one plenoptic device of said set of plenoptic devices,
- using respectively at least one transformation between said common 3D reference system and at least one 3D reference system, associated with said at least one plenoptic device that has provided said at least one plenoptic video data set of interest from which said information is obtained, for converting said information into said common 3D reference system,
- determining said common refocusing plane parameters from said information converted into said common 3D reference system.

It has to be noted, that according to the present disclosure, the information representative of at least one point of interest can be associated with at least one plenoptic video data set of interest provided by at least one plenoptic device different from the one that has provided the set of plenoptic video data, of which the refocusing of the rendering is aimed at.

According to a first embodiment, said information is provided automatically by said at least one plenoptic device providing said at least one plenoptic video data set of interest.

In other words, said first embodiment corresponds to an automatic refocusing mode for all, or a part, of the plenoptic acquisitions, exploiting the plurality of views, wherein every steps are performed without any interaction with a user, even for defining a point of interest for refocusing.

Considering, such an automatic mode if one plenoptic device of said set of plenoptic devices has moved (due to uncontrolled motion of the user), the main object of interest, as automatically obtained from the other plenoptic devices of said set, is still in focus when using the solution provided by the present disclosure.

Hence, even if the acquisition of one considered plenoptic device, among a set of plenoptic devices simultaneously capturing a same scene, is incorrectly framed, the user device experience associated with the considered plenoptic device is not diminished.

According to a particular aspect of said first embodiment, said information representative of at least one point of interest comprises at least two types of elements per point of interest:
- 3D coordinates of said point of interest,
- a 3D vector representative of a temporal motion of said point of interest.

Advantageously, when the common refocusing plane parameters are determined so as to follow a point (i.e. an object) of interest and are associated with a common refocusing plane oriented along its temporal motion (i.e. the line of action of a considered object in the scene), this common refocusing plane is automatically propagated through all plenoptic acquisitions.

For example, said 3D coordinates are determined, in an all in focus view associated with said plenoptic video data set of interest provided by at least one plenoptic device of said set of plenoptic devices, and using at least one of the elements belonging to the group comprising:
- a central point of said all in focus view;
- a saliency map of said all in focus view;
- a foreground object selection applied to said plenoptic video data set of interest from a depth map associated with said plenoptic camera.

More precisely, an AIF (All In Focus) image may be generated by focus fusion, according to which, the in-focus region is detected in each image of a focal stack associated with said plenoptic video data set of interest, then all these in-focus regions are fused to form an AIF image.

A saliency map is for example obtained as disclosed by O. Le Meur et al. in "*A coherent computational approach to model the bottom-up visival attention*" IEEE Transactions on Pattern Analysis and Machine Intelligence, 2006, 28, pp 802-817.

A foreground object selection from depth map of a plenoptic device is for example obtained as disclosed by T. E. Bishop et al. in "*Plenoptic Depth Estimation from Multiple aliased Views*" IEEE International workshop on 3-D Digital Imaging and Modeling (3DIM 09), ICCV Workshop, Kyoto, October, 2009.

It has to be noted that these two methods of the prior art are not applied in the particular context of the present disclosure aiming at determining common refocusing plane parameters shared between at least two plenoptic devices of a set of plenoptic devices capturing simultaneously a same scene.

According to a particular aspect of said first embodiment, said 3D vector representative of a temporal motion of said point of interest is obtained using a visual tracking technique such as the one disclosed by A. Yilmaz et al. in "Object Tracking: a survey", ACM Computing Survey (CSUR), 38 (4), 13.

According to a particular aspect of said first embodiment, determining of said common refocusing plane parameters from said information converted into said common 3D reference system comprises minimizing a function of said information converted into said common 3D reference system.

According to a second embodiment, said information is:
- representative of a single point of interest associated with a single plenoptic video data set of interest, and
- provided, through a user interface, associated to a device rendering one of said plenoptic video data set.

According to a third embodiment, said information is:
- representative of at least two points of interest respectively associated with at least one plenoptic video data set of interest, and
- provided, through at least one user interface, associated to at least one rendering device of said at least one plenoptic video data set of interest.

According to these second and third embodiments, the present disclosure provides a "social" refocusing mode where users (i.e. participants) can easily share comments and focus through a user interface. Thus, the present disclosure provides a communal sharing of user experience, benefiting from refocusing capability provided by plenoptic devices because the attention can be drawn to particular objects associated to a comment, emotion, etc.

For instance, said user interface is hosted on a server and corresponds to the one associated with a forum for exchanging information on the Internet, or the user interface of a social network. Such a user interface provides said information about the point of interest after the capturing of said plenoptic video data set of interest, permitting thus an a posteriori refocusing.

Said user interface can also be provided by the capturing plenoptic device itself, permitting thus almost a real time refocusing.

In the case of the second embodiment, only one point of interest is addresses in the information provided by said user interface, the conversion of said information in said 3D common reference system consists in converting the coordinates of a single point of interest.

According to the third embodiment, several points of interest are addressed in the information provided by said user interface, for example, by a plurality of users, or by a same user to obtain successive refocusing operations. The conversion of said information in said 3D common reference system consists in converting the coordinates of these several points of interest.

According to a particular aspect of the first and the third embodiments where at least two points of interest are addressed in the information to convert in said 3D common reference, the method according to the present disclosure comprises a spatial filtering or a clustering of said information representative of at least two points of interest respectively associated with at least two plenoptic video data sets of interest.

According to a particular feature, said clustering is a non-supervised clustering such as a mean shift clustering as the one disclosed by D. Comaniciu in "Mean Shift: A robust approach toward feature space analysis", IEEE Transactions on Pattern analysis and Machine Intelligence, 24(5), 603-619, or such as the non supervised clustering DBSCAN technique as disclosed M. Ester in "A density-based algorithm for discovering clusters in large spatial databases with noise", Proceedings of the $2^{nd}$ International Conference on Knowledge Discovery and Data mining, 1996, pp 226-231.

According to a particular feature, said spatial filtering, optionally performed according to the first or third embodiments, comprises the determining of a centre of mass of said plurality of points of interest.

According to another aspect of any one of the three above embodiments, said method comprises a temporal filtering of said information representative of at least one point of interest, said temporal filtering being applied over a part of said at least one plenoptic video data set of interest.

Such a temporal filtering permits to determine common refocusing plane parameters in said common 3D reference for a video segment, and thus to smooth temporally the obtained rendering refocusing planes.

According to another aspect of the present disclosure, at least two successive refocusings associated respectively with at least two rendering refocusing planes are performed at two distinct instants, said method comprises generating a sequence of frames whose respective focusing planes are located between said at least two rendering refocusing planes.

Such an aspect permits for example to obtain a smooth transition (i.e. a path) if a switch between the automatic mode corresponding to the first embodiment, and the social mode corresponding to one of the second and third embodiment is performed.

Another aspect of the present disclosure pertains to a device for refocusing, on at least one common point of interest, the rendering of one set of plenoptic video data provided by one plenoptic device belonging to a set of plenoptic devices capturing simultaneously a same scene.

Such a device comprises a processor configured to control:
  means for obtaining a common 3D reference system used for spatially locating said plenoptic device that has provided said set of plenoptic video data and at least one other device of said set of plenoptic devices,
  means for determining common refocusing plane parameters in said common 3D reference system,
  means refocusing the rendering of said set of plenoptic video data by converting said common refocusing plane parameters into a rendering refocusing plane of a 3D reference system associated with said plenoptic device that has provided said set of plenoptic video data, said converting using a transformation between said common 3D reference system and said 3D reference system associated with said plenoptic device.

Such a refocusing device is adapted especially for implementing the method for refocusing as described here above.

Such a device can be for instance completely implemented in the plenoptic device that has captured the set of plenoptic video data to render, or completely integrated in a distant server, or as an exploded device with one part in said plenoptic device and one part in said distant server.

For example, said means for obtaining and for determining corresponds to a content processing module, and said means of refocusing corresponds to a content rendering module.

It has to be noted that according to the present disclosure said refocusing device associated with said plenoptic device providing the set of plenoptic video data to render communicates, through a communication link, with at least one other plenoptic device of said set of plenoptic devices capturing simultaneously a same scene, and/or with a server communicating with at least one other plenoptic device of said set of plenoptic devices capturing simultaneously a same scene. Advantageously, a plurality of plenoptic devices among the set of plenoptic devices capturing simultaneously a same scene, upload their set of plenoptic video data to the distant server through the communication link. Any set of plenoptic video data, hosted on a distant server can then be accessed by any refocusing device.

According to a fourth and non-limiting embodiment, the sets of plenoptic video data are provided by a same plenoptic device capturing a same scene from different 3D poses at different points in time. The present disclosure is also applicable to a single plenoptic device capturing a same scene, from different positions over time. In case the captured scene does not change drastically during the various shots, the refocusing method is also applicable for refocusing a set of plenoptic video data among other sets of plenoptic video data captured by a single device from a same scene over a period of time. The fourth embodiment is applicable to both a method and a device for refocusing on at least one common point of interest, the rendering of a set of plenoptic video data. According to this specific and non-limiting embodiment the refocusing device associated with the plenoptic device providing the sets of plenoptic video data to render communicates, through a communication link, with the plenoptic device having captured the same scene, and/or with a server storing the sets of plenoptic video data. Indeed, the plenoptic device advantageously uploads the sets of plenoptic video data to the distant server through the communication link. Any set of plenoptic video data, hosted on a distant server can then be accessed by any refocusing device.

In addition, according to the second, the third or the fourth embodiments as disclosed above, said refocusing device communicates also, through said communication link, with a distant server hosting a user interface, permitting for at least one user to transmit the information representative of at least one point of interest. It has to be noted that said set of plenoptic devices, said at least one refocusing device comprising a content processing module and a content rendering module, said communication link, said distant server and said user interface form a refocusing system adapted for a sharing of plenoptic video data in a context of information sharing through social networks.

The present disclosure also concerns a computer program comprising software code adapted to perform a method for refocusing as described above.

Said computer program being a product downloadable from a communication network and/or recorded on a medium readable by a computer and/or executable by a processor, comprising program code instructions for implementing one of the methods according to the present disclosure.

The present disclosure also concerns a non-transitory program storage device, readable by a computer, tangibly embodying a program of instructions executable by the computer to perform a method for refocusing as described above.

Such a computer program may be stored on a computer readable storage medium. A computer readable storage medium as used herein is considered a non-transitory storage medium given the inherent capability to store the information therein as well as the inherent capability to provide retrieval of the information therefrom. A computer readable storage medium can be, for example, but is not limited to, an electronic, magnetic, optical, electromagnetic, infrared, or semiconductor system, apparatus, or device, or any suitable combination of the foregoing. It is to be appreciated that the following, while providing more specific examples of computer readable storage mediums to which the present principles can be applied, is merely an illustrative and not exhaustive listing as is readily appreciated by one of ordinary skill in the art: a portable computer diskette; a hard disk; a read-only memory (ROM); an erasable programmable read-only memory (EPROM or Flash memory); a portable compact disc read-only memory (CD-ROM); an optical storage device; a magnetic storage device; or any suitable combination of the foregoing.

It is to be understood that both the foregoing general description and the following detailed description are exemplary and explanatory and are not restrictive of the disclosed principles, as claimed.

It must also be understood that references in the specification to "one embodiment" or "an embodiment", indicate that the embodiment described may include a particular feature, structure, or characteristic, but every embodiment may not necessarily include the particular feature, structure, or characteristic.

Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The specific nature of the disclosure as well as other objects, advantages, features and uses of the disclosure will become evident from the following description of embodiments taken in conjunction with the accompanying drawings.

4. BRIEF DESCRIPTION OF THE DRAWINGS

Embodiments of the disclosed principles can be better understood with reference to the following description and drawings, given by way of example and not limiting the scope of protection, and in which:

FIG. 1, already presented in relation with prior art, shows the conceptual schematic of a plenoptic device;

FIG. 5A to 5C illustrate respectively three embodiments of the present disclosure;

Similar or same elements are referenced with the same reference numbers. The components in the figures are not necessarily to scale, emphasis instead being placed upon illustrating the disclosed principles.

5. DETAILED DESCRIPTION 5.1 General Principle

Figure 1:
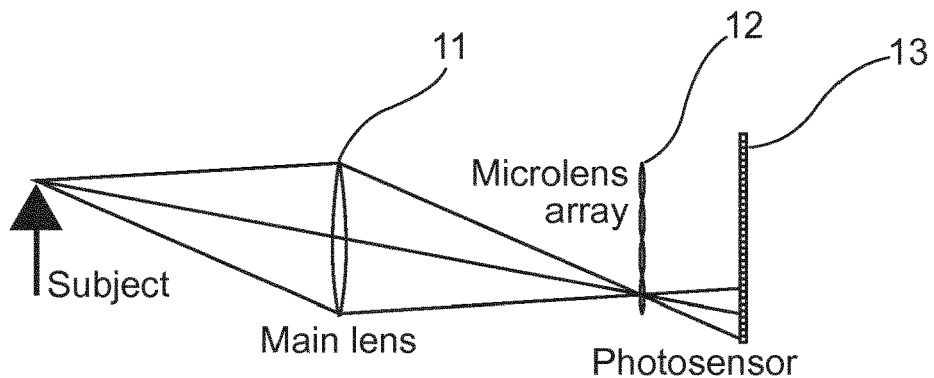

The general principle of the present disclosure consists in a new way of refocusing a video content exploiting the plurality of views and the refocusing capability of the plenoptic devices capturing a same scene simultaneously, by providing a mean to share refocusing plane parameters among plenoptic devices, defining a common refocusing set of parameters and applying the common set of parameters to each camera.

More precisely, as described in the following, two refocusing modes are proposed.

On the one hand, an automatic mode, where the area of interest for refocusing is determined automatically through content analysis, and all plenoptic acquisitions are refocused accordingly, and on the other hand a social mode, where participants can share both comments and in-focus areas with others through a user interface.

Various non-limiting embodiments of a refocusing method according to the present disclosure, of corresponding device and of a computer-readable storage medium for refocusing the rendering of one set of plenoptic video data are disclosed in the next sections.

This disclosure may, however, be embodied in many alternate forms and should not be construed as limited to the embodiments set forth herein. Accordingly, while the disclosure is susceptible to various modifications and alternative forms, specific embodiments thereof are shown by way of example in the drawings and will herein be described in detail. It should be understood, however, that there is no intent to limit the disclosure to the particular forms disclosed, but on the contrary, the disclosure is to cover all modifications, equivalents, and alternatives falling within the spirit and scope of the disclosure as defined by the claims.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components but do not preclude the presence or addition of one or more other features, integers, steps, operations, elements, components, and/or groups thereof.

Moreover, when an element is referred to as being "responsive" or "connected" to another element, it can be directly responsive or connected to the other element, or intervening elements may be present. In contrast, when an element is referred to as being "directly responsive" or "directly connected" to other element, there are no intervening elements present. As used herein the term "and/or" includes any and all combinations of one or more of the associated listed items and may be abbreviated as"/".

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure.

Although some of the diagrams include arrows on communication paths to show a primary direction of communication, it is to be understood that communication may occur in the opposite direction to the depicted arrows.

Some embodiments are described with regard to block diagrams and operational flowcharts in which each block represents a circuit element, module, or portion of code which comprises one or more executable instructions for implementing the specified logical function(s). It should also be noted that in other implementations, the function(s) noted in the blocks might occur out of the order noted. For example, two blocks shown in succession may, in fact, be executed substantially concurrently or the blocks may sometimes be executed in the reverse order, depending on the functionality involved.

Reference herein to "one embodiment" or "an embodiment" means that a particular feature, structure, or characteristic described in connection with the embodiment can be included in at least one implementation of the disclosure. The appearances of the phrase "in one embodiment" or "according to an embodiment" in various places in the specification are not necessarily all referring to the same embodiment, nor are separate or alternative embodiments necessarily mutually exclusive of other embodiments.

Reference numerals appearing in the claims are by way of illustration only and shall have no limiting effect on the scope of the claims.

While not explicitly described, the present embodiments and variants may be employed in any combination or sub-combination.

The disclosure is described for encoding/decoding pixels of a view of a matrix of views obtained from light-field data but extends to the encoding/decoding of a sequence of a matrix of views obtained from light-field data (plenoptic video) because each matrix of views belonging to the sequence is sequentially encoded/decoded as described below.

5.2 the Refocusing Method

Figure 2:
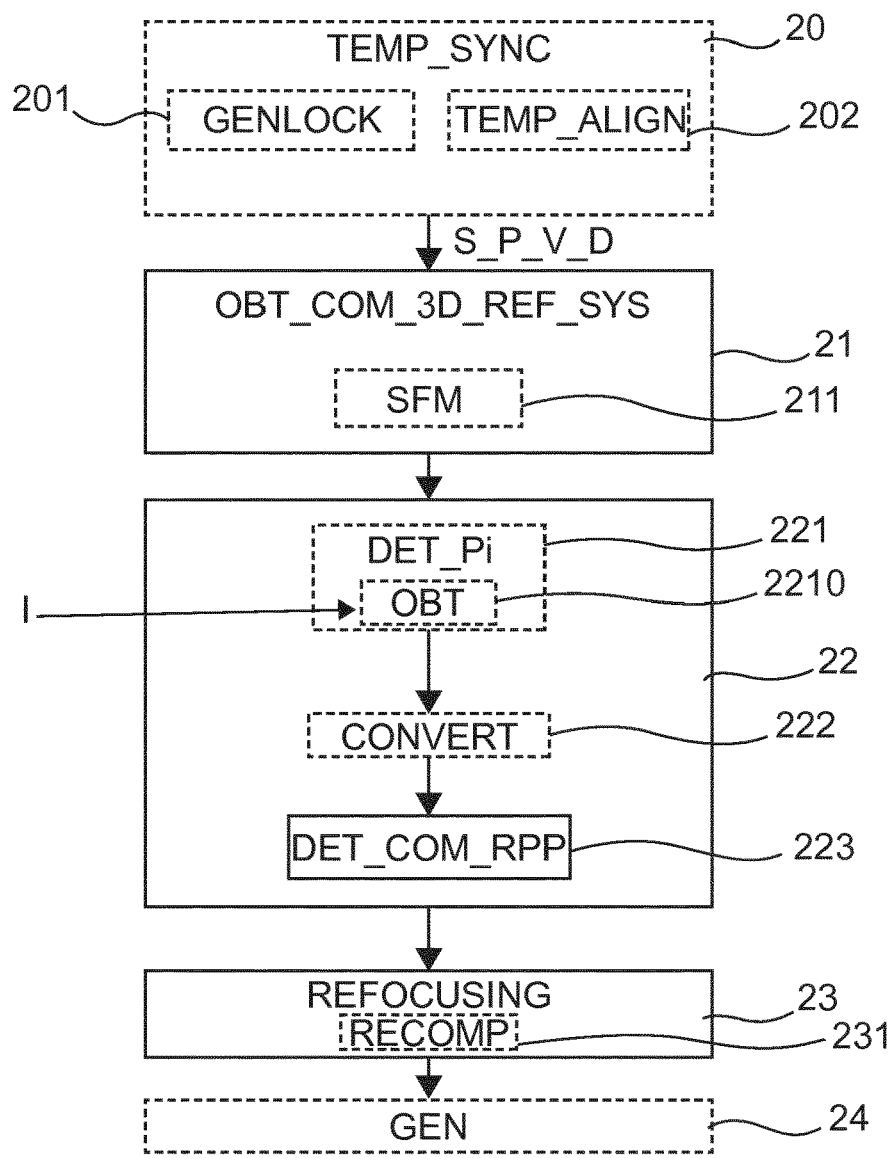
FIG. 2 shows schematically a diagram of the main steps of the method for encoding according to a general embodiment of the present disclosure.

FIG. 2 shows schematically a diagram of the main steps of the method for refocusing according to the present disclosure, the method being performed by a refocusing device.

Figure 3A:
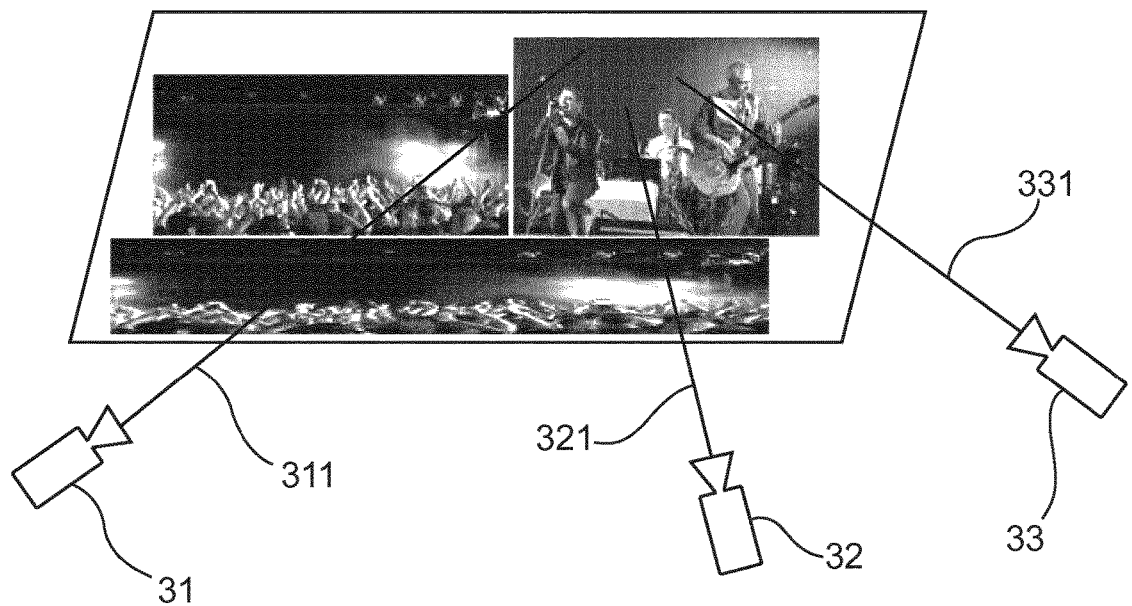
FIGS. 3A to 3F illustrate the different steps of the present disclosure considering an example where three plenoptic devices capturing simultaneously the same scene are involved.

An example of a context of application of the present disclosure is for example illustrated FIG. 3A, where a set of three plenoptic devices (31, 32, 33) is considered for capturing simultaneously plenoptic video data associated with a concert.

These three plenoptic devices can be for example integrated in the mobile phone of three different users located at different location in the place where the concert is performed.

On FIG. 3A, the optical axis (311, 321, 331), of each plenoptic device is represented.

According to the present disclosure, the method for refocusing the rendering of one set of plenoptic video data (S_P_V_D) may be implemented by a processor of said refocusing device and comprises three main steps, as illustrated by FIG. 2:

obtaining (21) a common 3D reference system used for spatially locating said plenoptic device that has provided said set of plenoptic video data and at least one other device of said set of plenoptic devices, from said at least one common point of interest, determining (22) common refocusing plane parameters in said common 3D reference system, refocusing (23) the rendering of said set of plenoptic video data by converting (231) said common refocusing plane parameters into a rendering refocusing plane of a 3D reference system associated with said plenoptic device that has provided said set of plenoptic video data, said converting (231) using a transformation between said common 3D reference system and said 3D reference system associated with said plenoptic device.

These, three mains steps will be described in more details in the following.

According to the general embodiment as illustrated by FIG. 2, the method according to the present disclosure optionally first (as represented in dotted lines) a temporal synchronisation (20) of said set of plenoptic video data (S_P_V_D) to render provided by a first plenoptic device and at least one other set of plenoptic video data provided another plenoptic device, said first and said another plenoptic devices belonging to a set of plenoptic devices capturing simultaneously a same scene, such as a concert, a party, a sport event, etc.

Without performing such an option (20), it can be noted that the refocusing device according to the present disclosure receives directly synchronised sets of plenoptic video data, the temporal synchronisation being performed beforehand by another module or server.

Such a temporal synchronisation (20), performed or not by the refocusing device of the present disclosure, is obtained using a third-party technique like genlock (201), or using post-acquisition synchronization technique such as for example the audio temporal alignment (202) technique as described by A. Bagri as cited above, or using a visual mode of post-acquisition temporal alignment (202) using the technique of M. Douze as cited above. In any of the "social mode" embodiments, a post-acquisition synchronization is for example advantageously performed in the server after or while the sets of plenoptic video data are uploaded to the server.

Then, the first main step of obtaining (21) a common 3D reference system used for spatially locating said plenoptic device that has provided said set of plenoptic video data and at least one other device of said set of plenoptic devices is performed.

In other words, such a step (21) corresponds to the definition used to translate refocusing plane parameters of each plenoptic device (i.e. plenoptic camera).

At each instant, the 3D camera pose is computed for each camera using structure-from-motion (211) as disclosed by F. Dellaert as cited above, which allows through optimization techniques the joint estimation of 3D structures of imaged scene (point cloud computation via triangulation which represent the scene) and of the 3D pose of each camera with respect to the common 3D reference system where point cloud is defined.

Since according to the present disclosure cameras are plenoptic, only the central view of each of them is used in this step. At completion of this process, a point in the common 3D reference system can be projected into each camera reference (named later as inverse transformation of parameters from common 3D reference system to each camera).

Conversely, given a 2D point in one sub-image of one plenoptic camera, its distance to the camera can be computed thanks to the sampling of the light field by said camera, and hence its 3D position in the common reference can be computed (named later as direct transformation from camera parameters to common 3D reference system).

Figure 3B:
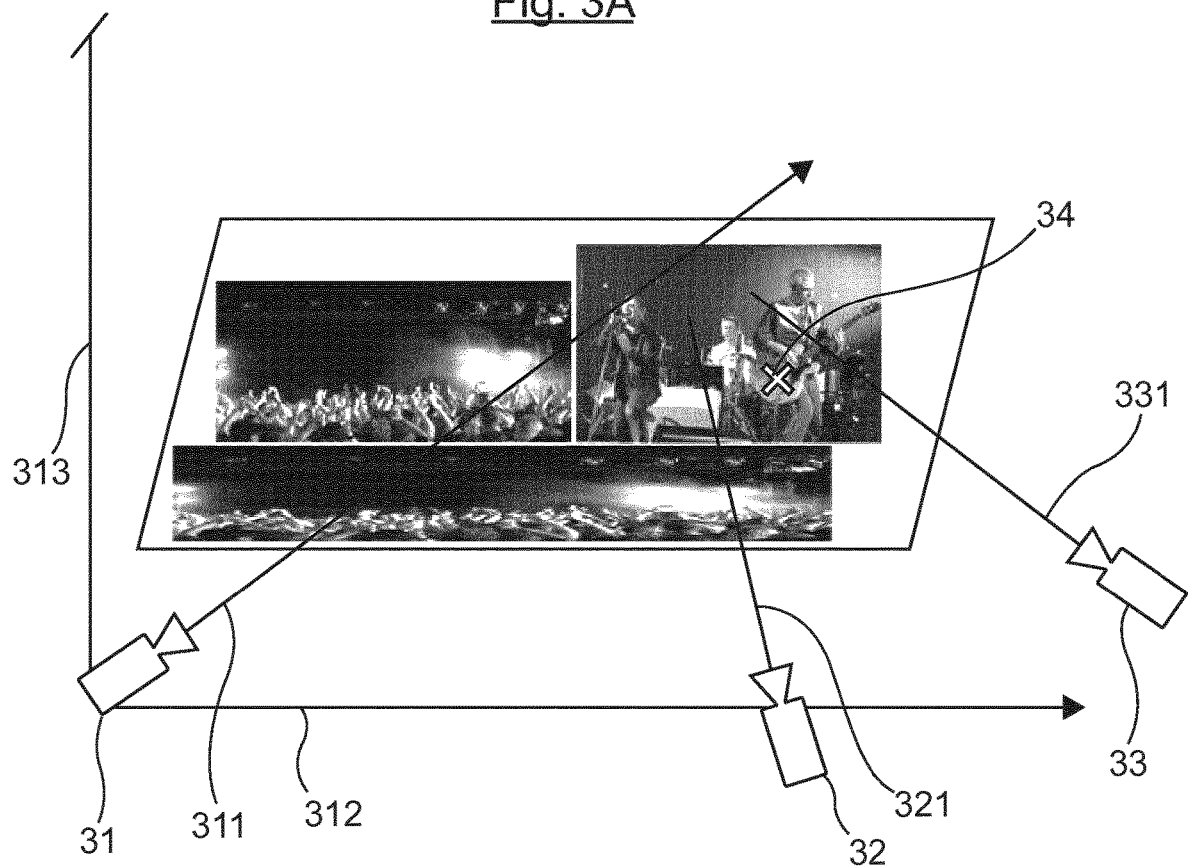
Figure 3C:
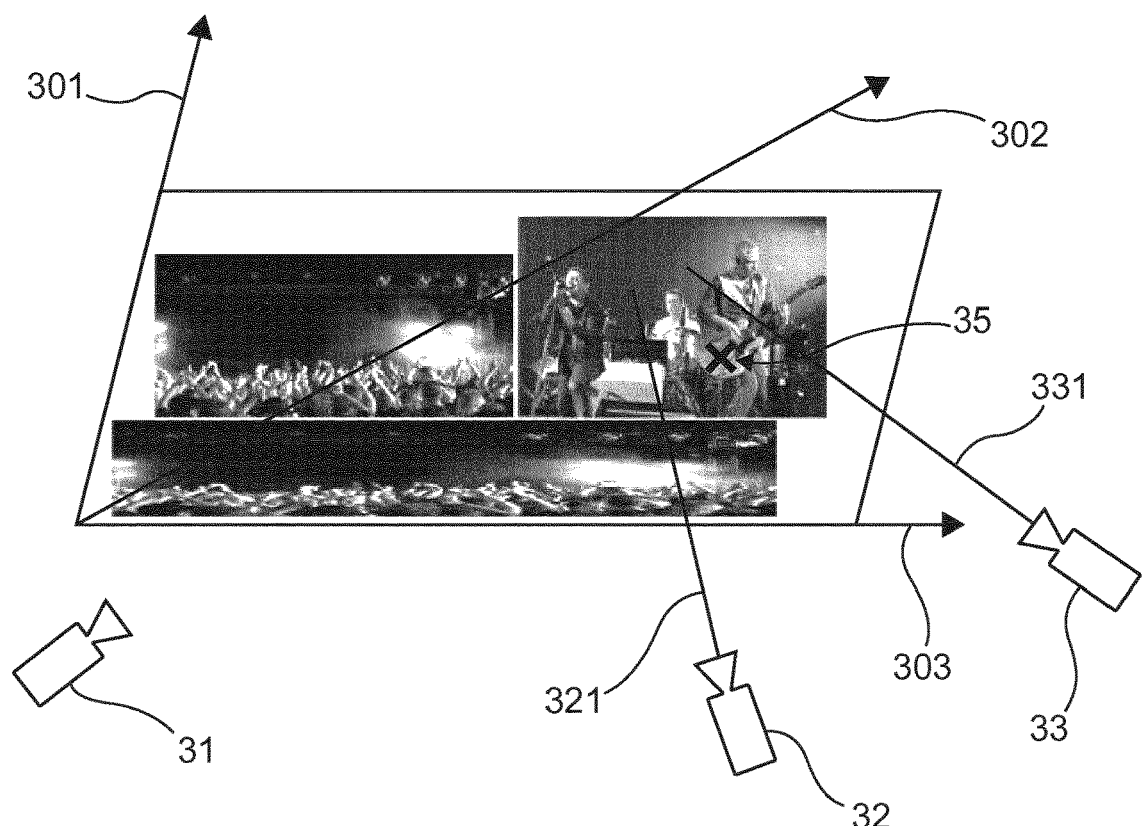
Figure 4:
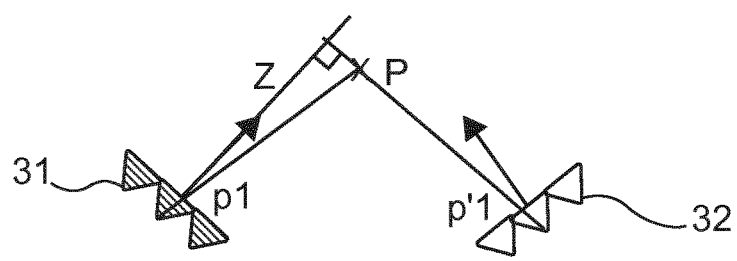
FIG. 4 illustrates the obtaining of a common 3D reference system according to the present disclosure.

Such direct and inverse transformations are illustrated by FIG. 4, where the direct transformation permits a path from the point p1 expressed in the 3D reference system associated with the plenoptic device 31 as represented in FIG. 3B by the three axis 311, 312 and 313, to the point P expressed in the common 3D reference system as represented in FIG. 3C by the three axis 301, 302, 303 obtained using a structure-from-motion (211).

Such a direct transformation is obtained by taking into account the depth parameters, provided from the light field associated with the set of plenoptic video data provided by said plenoptic device 31.

The corresponding inverse transformation corresponds to the projection of P to p1 knowing the pose of the plenoptic device (i.e. camera) 31 in the common 3D reference system as illustrated in FIG. 3C.

Once said common 3D reference system (301, 302, 303) is obtained (21), the determining (22) of common refocusing plane parameters in said common 3D reference system is performed from at least one common point of interest.

Generally, said step of determining (22) of common refocusing plane parameters in said common 3D reference system (corresponding to the three axis 301, 302 and 303 of FIG. 3C) comprises first determining (221) of said at least one common point of interest (35) by obtaining (2210) information I representative of at least one point of interest (34) (as represented in FIG. 3B, said point of interest 34 corresponding to a guitar) associated with at least one plenoptic video data set of interest provided by at least one plenoptic device of said set of plenoptic devices.

Then, the use of respectively at least one transformation (i.e. an inverse transformation as described above) between said common 3D reference system and at least one 3D reference system, associated with said at least one plenoptic device that has provided said at least one plenoptic video data set of interest from which said information is obtained, for converting (222) said information into said common 3D reference system is performed.

Figure 3D:
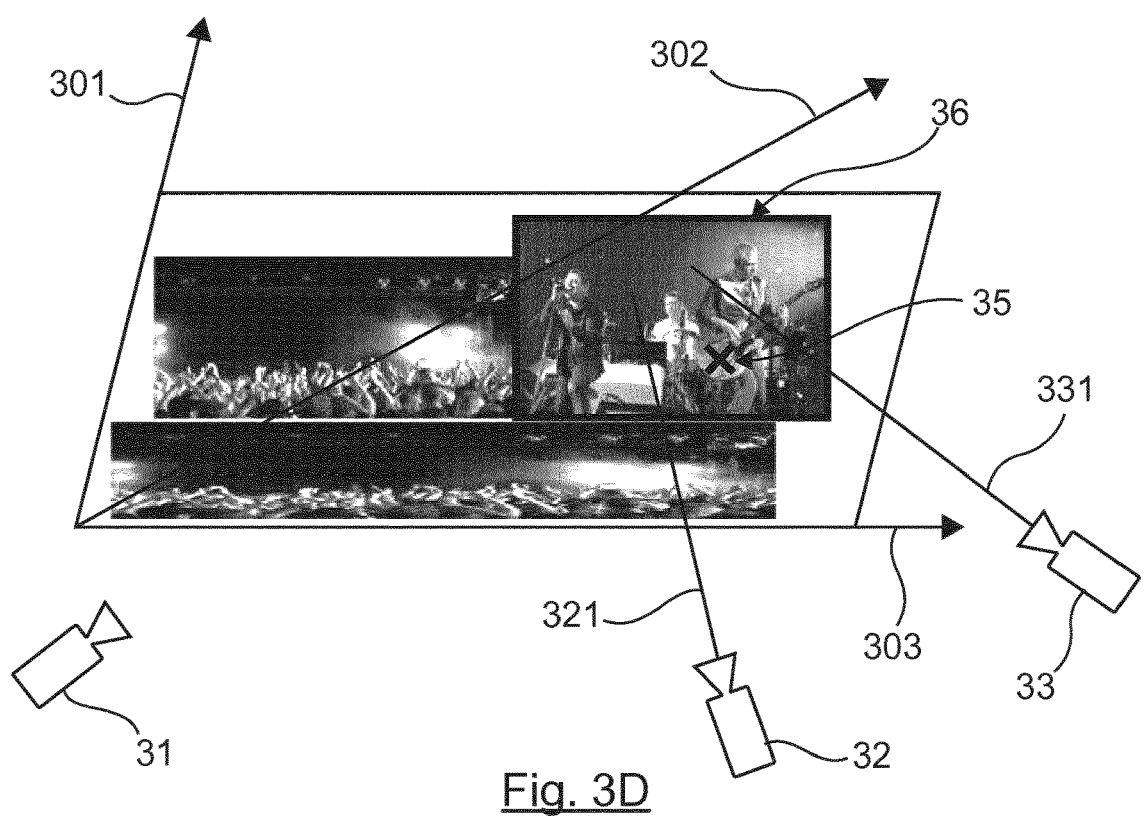

Once said converting (222) has been executed, said determining (223) of said common refocusing plane parameters, corresponding to the refocusing plane 36 of FIG. 3D, is performed from said information converted into said common 3D reference system.

Figure 5A:
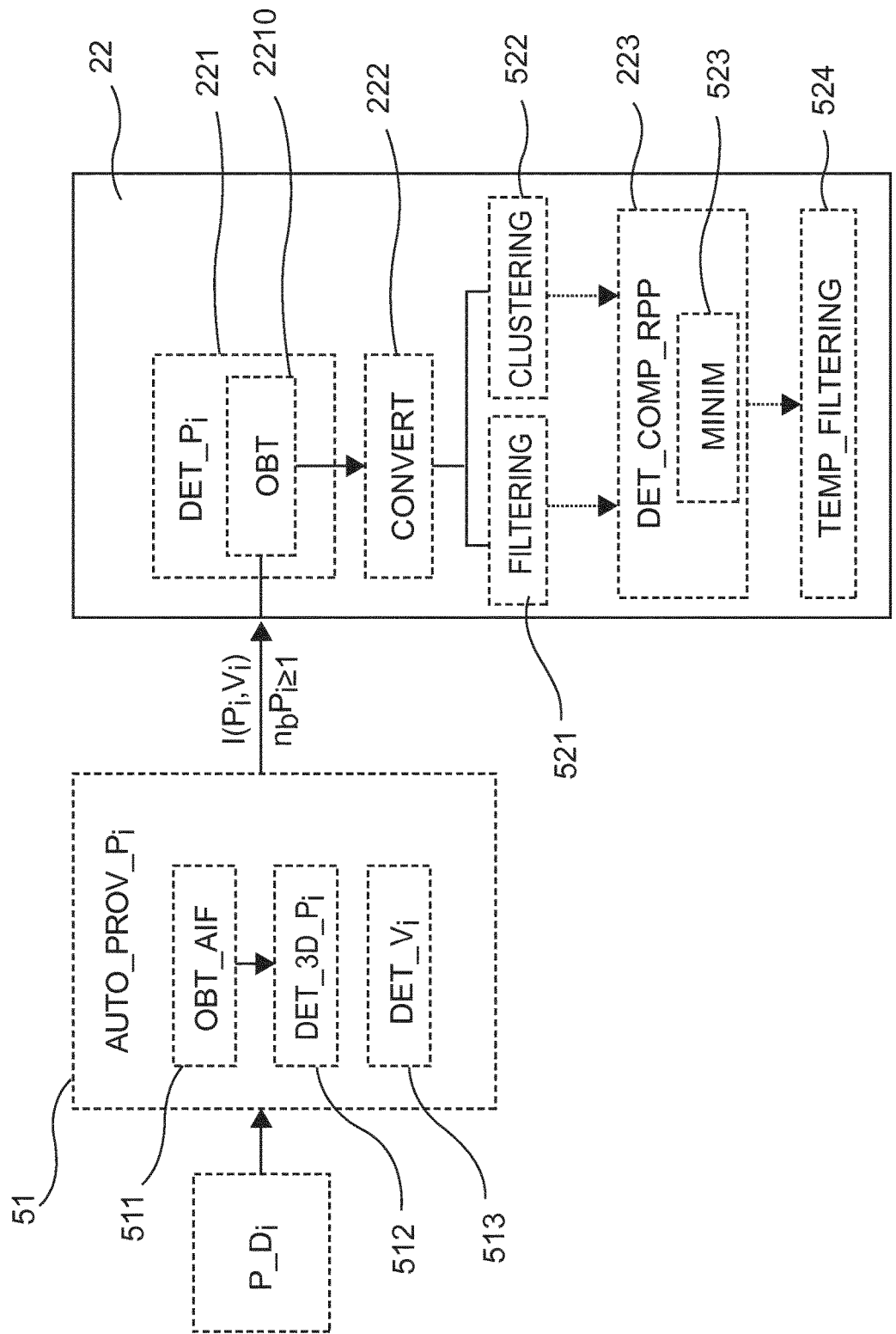

Other options (as represented in dotted lines) can be implemented for said step of determining (22) of common refocusing plane parameters in said common 3D reference system according to three embodiments illustrated respectively by FIGS. 5A to 5C corresponding respectively to an automatic mode for providing said at least one plenoptic video data set of interest, a first alternative of a social mode where a single user is considered for providing said at least one plenoptic video data set of interest, and a second alternative of a social mode where multiple users are considered for providing said at least one plenoptic video data set of interest.

Considering the "automatic mode" of the first embodiment as illustrated by FIG. 5A, said information is provided automatically (51) by said at least one plenoptic device providing said at least one plenoptic video data set of interest.

More precisely, each of the N (in FIGS. 3A to 3F N=3) plenoptic camera $C_i$ will have to define (512, 513) its point of interest $P_i$ and its line of action defined by a 3D vector $v_i$. Obviously, the case where N=1 can also be implemented according the automatic mode but is not represented.

In other words, said information representative of at least one point of interest comprises at least two types of elements per point of interest:

3D coordinates of said point of interest $P_i$, a 3D vector $v_i$ representative of a temporal motion of said point of interest.

For example, considering the example as illustrated by FIGS. 3A to 3F, 3 points of interest $P_i$ will compose the information I representative of at least one point of interest.

To compute $P_i$, the all in focus image (AIF image) of the considered plenoptic device $C_i$ is used (511) on which at least one of the following techniques are used to identified a point of interest:

a central point of said all in focus view;
a saliency map of said all in focus view (obtained according the technique as disclosed by O. Le Meur as cited above);
a foreground object selection from depth map of plenoptic camera (as disclosed by O. T. E. Bishop as cited above).

To compute $v_i$, visual tracking techniques are used (as disclosed by A. Yilmaz as cited above).

For each frame, each camera shares the ($P_i$, $v_i$) set of plenoptic video data, which will be translated in the common 3D reference system by a content processing module of the refocusing device according to the present disclosure.

In the common 3D reference system, at reception (2210) of all set of parameters, a spatial filtering (521) or a clustering (522) process is applied in order to eliminate non relevant points.

Figure 6A:
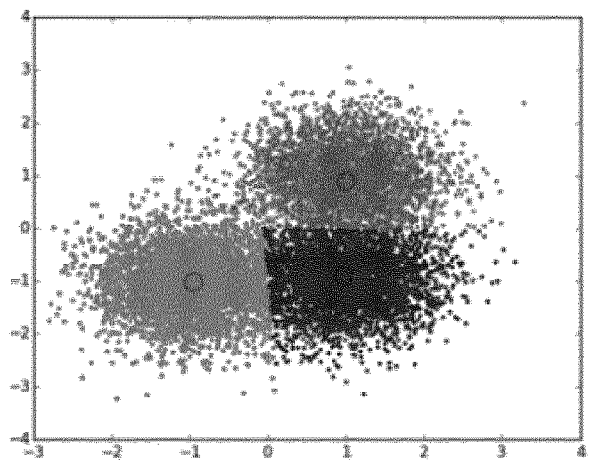
FIGS. 6A and 6B illustrate a particular aspect of the first and third embodiment.
Figure 6B:
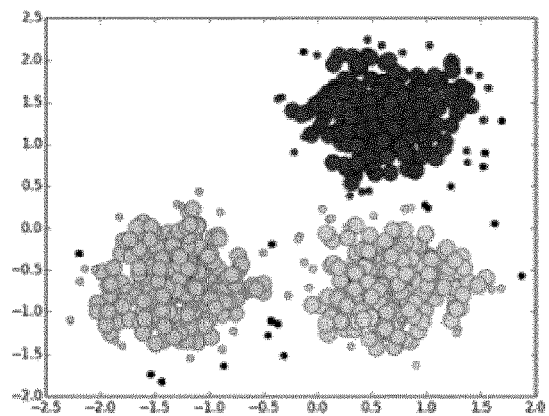

For instance, to limit the influence of wrong point estimation, or noise, or incoherent data, a clustering technique can be used. Using a non-supervised clustering, such as mean shift as disclosed by D. Comaniciu as cited above and illustrated by FIG. 6A, or using a DBscan as disclosed by M. Ester as cited above and illustrated by FIG. 6B, on the set of points $\{P_i, i \in [1, N]\}$, clusters of coherent points can be obtained.

Then, the principal cluster (i.e., cluster with the maximum number of points) can be extracted, and all points that do not belong to this cluster are discarded from the rest of the process.

From the group of valid set of transformed parameters ($P_i$, $v_i$), a refocusing plane π (36) is then determined.

The refocusing plane is for instance obtained by minimizing (523):

$$\hat{\pi} = \underset{\pi}{\mathrm{argmin}}\left(\sum_{i=1}^{N} d(\pi, P_i)^2 + \alpha d(\pi, v_i)^2\right), \quad [1]$$

Where α is a parameter to tune. If α=0, the plane π (36) approximates the datapoints $P_i$. When α increases, the plane π (36) is encouraged to comprise the line of actions.

Optionally, a temporal filtering (524) module is applied over a set of frame information in order to determine a refocusing plane for a video segment. Actually, the equation 1 above is solved at each time code t, leading to a plane π(t). Any temporal filtering (524) (autoregressive model, Kalmann filtering also known as linear quadratic estimation (LQE), etc.) could be used here to smooth temporally the position of the plane π (36).

It has to be noted that such a temporal filtering (524) could be optionally done at plenoptic camera (i.e. plenoptic device) level that would share the pair ($P_i$, $v_i$) for a video segment rather than for each frame.

Considering a second embodiment corresponding to the first alternative of a "social mode" as illustrated by FIG. 5B, said information is representative of a single point of interest associated with a single plenoptic video data set of interest, and provided (525), through a user interface, associated to a device rendering one of said plenoptic video data sets.

More precisely, according to this second embodiment, one user (53) selects an object defining a point $P_i$. The refocusing plane for this camera associated with said user (53) is defined as the plane including $P_i$ and perpendicular to the optical axis of the camera as illustrated by FIG. 3F.

Then, the refocusing plane defined by said user (53) into said 3D reference system associated with said plenoptic device is translated in the common 3D reference system corresponding to the three axis (301, 302, 303) of FIG. 3D. During this translation, the three steps of determining (221) at least one common point of interest (comprising the obtaining (2210) of said point $P_i$ defined by said user (53)), converting (222) and determining (223) common refocusing plane parameters common to all embodiments are performed, and, as in the first embodiment, a temporal filtering optionally can also be applied (524) over a set of frame information in order to determine a refocusing plane for a video segment.

Considering a third embodiment corresponding to the second alternative of a "social mode" as illustrated by FIG. 5C, said information is representative of at least two points of interest.

According to a first example of this third embodiment, said two points of interest, are defined by distinct users (54 and 55), and respectively associated with at least two plenoptic video data sets of interest, and provided (525), through at least one user interface, associated to at least two rendering devices of said at least two plenoptic video data sets of interest.

According to another example of this third embodiment, said two points of interest, are defined by a same user (54 or 55) aiming for example to obtain successive refocusing operations or, when it is possible, aiming to obtain a refocusing plane comprising simultaneously several points of interest. In other words, according to this third embodiment where a plurality of points of interest (54 and 55) are involved, each user selects at least one object defining a point of interest $P_i$. The refocusing plane, for each point of interest $P_i$, and for each plenoptic camera associated with a considered user is defined as the plane including Pi and perpendicular to optical axis of the camera.

Then, for each frame, and for each plenoptic device associated with a considered user the refocusing plane π, and the point $P_i$ defined by the considered user in the 3D reference system associated with said plenoptic device, is translated in the common 3D reference system corresponding to the three axis (301, 302, 303) of FIG. 3D by the content processing module of the refocusing device according to the disclosed principles.

In the common 3D reference system, optionally, at reception of all set of parameters, a spatial filtering (521) or a clustering (522) process is applied in order to group a set of N points $P_i$.

That can be achieved simply by computing robustly the center of mass of the point set. Then, any point deviating from the computed distribution (i.e., whose distance to the center of mass is above three times the diameter of the point set) is discarded.

From the group of N transformed parameters ($P_i$, $\pi_i$), N refocusing planes $\pi_i$ are determined considering that each refocusing plane $\pi_i$ is the only plane passing through the points of interest $P_i$ of the group resulting from the spatial filtering (521) or the cluster (522), and orthogonal to the optical axis of the plenoptic device(s) providing respectively the set(s) of plenoptic video data to render.

Optionally, as in the first and/or second embodiments, a temporal filtering optionally can also be applied (524) over a set of frame information in order to determine a refocusing plane for a video segment.

Figure 3E:
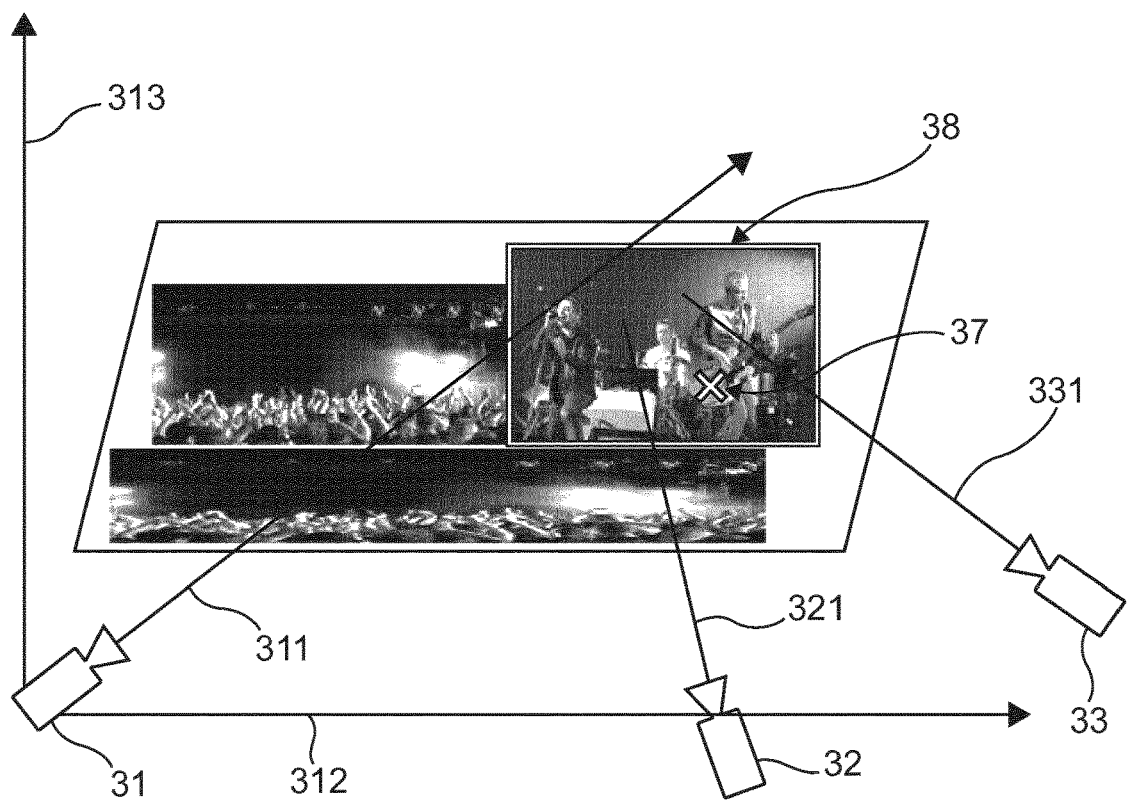
Figure 3F:
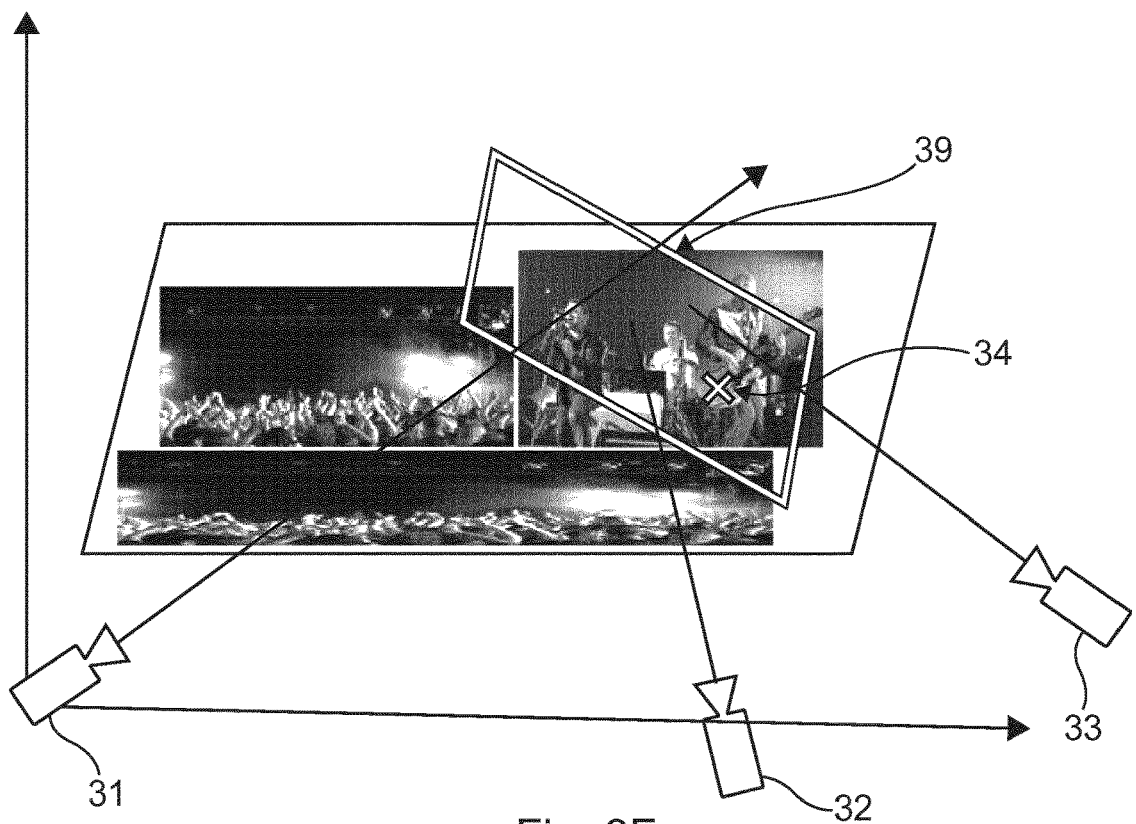

Considering FIG. 2, once said second main step of determining (22) common refocusing plane parameters in said common 3D reference system is performed according to one of the three above described embodiments, said refocusing (23) of the rendering of said set of plenoptic video data is executed by converting (231) said common refocusing plane parameters associated to the plane π (36) into a rendering refocusing plane (37) of a 3D reference system (corresponding to the three axis 311, 312, and 313) associated with said plenoptic device that has provided said set of plenoptic video data, said converting (231) using a transformation between said common 3D reference system and said 3D reference system associated with said plenoptic device as illustrated by FIG. 3E.

In other words, parameters of the refocusing plane π are sent to each camera after inverse transformation in order to match to each 3D camera reference.

It can be noted that such a resulting rendering refocusing plane (37) obtained according to the sharing of common refocusing plane parameters between at least two plenoptic devices of a set of plenoptic devices capturing simultaneously a same scene of the present disclosure, does not corresponds to the plane (39) perpendicular to the optical axis of the plenoptic device 31 that would used for refocusing according to the methods of the prior art as illustrated by FIG. 3F.

Primary implementation consists in applying directly the refocusing plane parameters associated to the plane π (36) for each plenoptic camera.

Optionally the resulting rendering refocusing plane (37) could be post-processed (231) to take into account the plenoptic camera position. In that case distance between refocusing plane and plane perpendicular to the optical axis should be computed and corrected to not exceed a certain value.

One example of proposed implementation is to compute the scalar product between the two orthogonal vectors of the planes 37 and 39, if the result is below 0.5, then the rendering refocusing plane (37) is moved towards the direction of the perpendicular plane (39) in order to reach a scalar product above 0.5.

The determination of the value (here 0.5) can be a system value or a user value set thanks to a specific user interface such as the one (525) used for the second and third embodiments allowing the user to select his preferences.

In case of transition between the automatic and the social mode, or in case of switch between multiples user selections, a smooth transition between two refocusing planes is optionally computed by generating (24) a sequence of refocused frames creating the path between two refocusing planes.

5.3 Structures of the Refocusing Device

On FIG. 2, the modules are functional units, which may or not be in relation with distinguishable physical units. For example, these modules or some of them may be brought together in a unique component or circuit, or contribute to functionalities of a software. A contrario, some modules may potentially be composed of separate physical entities. The apparatus which are compatible with the disclosure are implemented using either pure hardware, for example using dedicated hardware such ASIC or FPGA or VLSI, respectively «Application Specific Integrated Circuit», «Field-Programmable Gate Array», «Very Large Scale Integration», or from several integrated electronic components embedded in a device or from a blend of hardware and software components.

Figure 7:
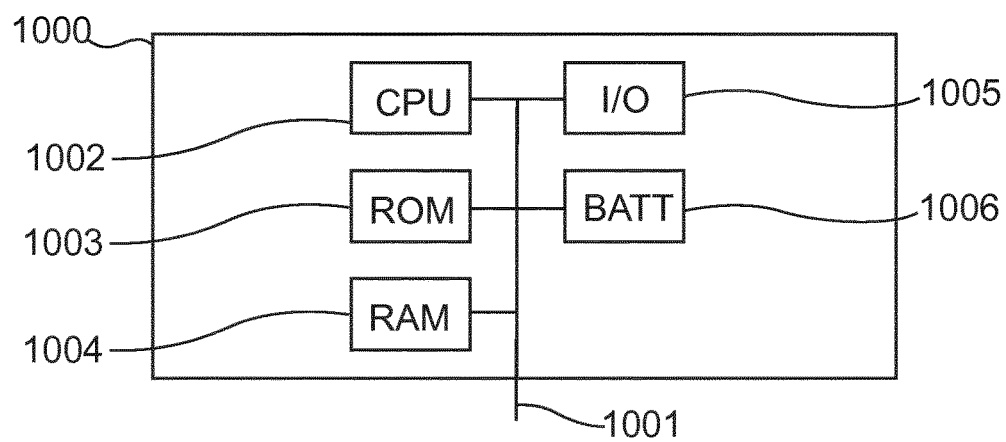
FIG. 7 shows an example of architecture of a device in accordance with an embodiment of the disclosure.

FIG. 7 represents an exemplary architecture of a device 1000 which may be configured to implement a refocusing method described in relation with FIGS. 2-6.

Device 1000 comprises following elements that are linked together by a data and address bus 1001:
- a microprocessor 1002 (or CPU), which is, for example, a DSP (or Digital Signal Processor);
- a ROM (or Read Only Memory) 1003;
- a RAM (or Random Access Memory) 1004;
- an I/O interface 1005 for transmission and/or reception of data, from an application; and
- a battery 1006.

According to a variant, the battery 1006 is external to the device. Each of these elements of FIG. 7 are well-known by those skilled in the art and won't be disclosed further. In each of mentioned memory, the word «register» used in the specification can correspond to area of small capacity (some bits) or to very large area. ROM 1003 comprises at least a program and parameters. Algorithm of the method according to the disclosure is stored in the ROM 1003. When switched on, the CPU 1002 uploads the program in the RAM and executes the corresponding instructions.

RAM 1004 comprises, in a register, the program executed by the CPU 1002 and uploaded after switch on of the device 1000, input data in a register, intermediate data in different states of the method in a register, and other variables used for the execution of the method in a register.

The implementations described herein may be implemented in, for example, a method or a process, an apparatus, a software program, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

According to a specific embodiment of refocusing device, the set of plenoptic video data and/or the information representative of at least one point of interest is obtained from a source. For example, the source belongs to a set comprising:
- a local memory (1003 or 1004), e.g. a video memory or a RAM (or Random Access Memory), a flash memory, a ROM (or Read Only Memory), a hard disk;
- a storage interface, e.g. an interface with a mass storage, a RAM, a flash memory, a ROM, an optical disc or a magnetic support;
- a communication interface (1005), e.g. a wireline interface (for example a bus interface, a wide area network interface, a local area network interface) or a wireless interface (such as a IEEE 802.11 interface or a Bluetooth® interface); and
- a picture capturing circuit (e.g. a sensor such as, for example, a CCD (or Charge-Coupled Device) or CMOS (or Complementary Metal-Oxide-Semiconductor)).

According to different embodiments of refocusing or refocusing device, a bitstream delivered by the refocusing device is sent to a destination, for example a rendering device. As an example, the bitstream is stored in a local or remote memory, e.g. a video memory (1004) or a RAM (1004), a hard disk (1003). In a variant, the bitstreams is sent to a storage interface, e.g. an interface with a mass storage, a flash memory, ROM, an optical disc or a magnetic support and/or transmitted over a communication interface (1005), e.g. an interface to a point to point link, a communication bus, a point to multipoint link or a broadcast network.

Implementations of the various processes and features described herein may be embodied in a variety of different equipment or applications. Examples of such equipment include, a post-processor processing output from a plenoptic device, a pre-processor providing input to a rendering device, a web server, a set-top box, a laptop, a personal computer, a cell phone, a PDA, and any other device for processing a picture or a video or other communication devices.

Additionally, the methods may be implemented by instructions being performed by a processor, and such instructions (and/or data values produced by an implementation) may be stored on a computer readable storage medium. A computer readable storage medium can take the form of a computer readable program product embodied in one or more computer readable medium(s) and having computer readable program code embodied thereon that is executable by a computer. A computer readable storage medium as used herein is considered a non-transitory storage medium given the inherent capability to store the information therein as well as the inherent capability to provide retrieval of the information therefrom. A computer readable storage medium can be, for example, but is not limited to, an electronic, magnetic, optical, electromagnetic, infrared, or semiconductor system, apparatus, or device, or any suitable combination of the foregoing. It is to be appreciated that the following, while providing more specific examples of computer readable storage mediums to which the present principles can be applied, is merely an illustrative and not exhaustive listing as is readily appreciated by one of ordinary skill in the art: a portable computer diskette; a hard disk; a read-only memory (ROM); an erasable programmable read-only memory (EPROM or Flash memory); a portable compact disc read-only memory (CD-ROM); an optical storage device; a magnetic storage device; or any suitable combination of the foregoing.

The instructions may form an application program tangibly embodied on a processor-readable medium.

Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method comprising:
   obtaining a first plenoptic video data capturing a scene from a first plenoptic device;
   obtaining a common 3D reference system for spatially locating the first plenoptic device and a second plenoptic device, the second plenoptic device having captured a second plenoptic video data from the scene, and the first plenoptic video data and the second plenoptic video data having been temporally aligned; and
   refocusing a rendering of at least a part of said first plenoptic video data on at least one common point of interest based on the second plenoptic video data, the common 3D reference system, and said temporal alignment.

2. The method according to claim 1, wherein obtaining a common 3D reference system comprises using structure-from-motion for determining a first 3D pose for said first plenoptic device and a second 3D pose for said second plenoptic device.

3. The method according to claim 1, further comprising determining common refocusing parameters in said common 3D reference system from said at least one common point of interest, said common refocusing parameters being converted in a rendering refocusing plane of a 3D reference system associated with said first plenoptic device.

4. The method according to claim 3, wherein said refocusing is recomputed when a distance between said rendering refocusing plane and a plane perpendicular to an optical axis of said first plenoptic device, exceeds a predetermined value.

5. The method according to claim 3, wherein said determining of common refocusing plane parameters in said common 3D reference system comprises:
   determining of said at least one common point of interest by obtaining information representative of at least one point of interest associated with at least one plenoptic video data of interest capturing said scene and provided by a third plenoptic device;
   using respectively at least one transformation between said common 3D reference system and at least one 3D reference system, associated with said third plenoptic device, for converting said information into said common 3D reference system; and
   determining said common refocusing plane parameters from said information converted into said common 3D reference system.

6. The method according to claim 5, wherein said information is provided automatically by said third plenoptic device.

7. The method according to claim 5, wherein said information is:
   representative of a single point of interest associated with a single plenoptic video data of interest; and
   provided, through a user interface, associated with a device rendering one of said plenoptic video data capturing said scene.

8. The method according to claim 5, wherein said information is:
   representative of at least two points of interest associated with at least one plenoptic video data of interest; and
   provided, through at least one user interface, associated with at least one device rendering one of said at least one plenoptic video data of interest.

9. The method according to claim 5, wherein said method comprises a temporal filtering of said information representative of at least one point of interest, said temporal filtering being applied over a part of said at least one plenoptic video data of interest.

10. The method according to claim 1, wherein when at least two successive refocusings associated respectively with at least two rendering refocusing planes are performed at two distinct instants, said method comprises generating a sequence of frames whose respective focusing planes are located between said at least two rendering refocusing planes.

11. A device comprising a processor configured to:
obtain a first plenoptic video data capturing a scene from a first plenoptic device;
obtain a common 3D reference system for spatially locating the first plenoptic device and a second plenoptic device, the second plenoptic device having captured a second plenoptic video data from the scene, and the first plenoptic video data and the second plenoptic video data having been temporally aligned; and
refocus a rendering of at least a part of said first plenoptic video data on at least one common point of interest based on the second plenoptic video data, the common 3D reference system, and said temporal alignment.

12. The device according to claim 11, wherein the processor is further configured to obtain the common 3D reference system using structure-from-motion for determining a first 3D pose for said first plenoptic device and a second 3D pose for said second plenoptic device.

13. The device according to claim 11, wherein the processor is further configured to determine common refocusing parameters in said common 3D reference system from said at least one common point of interest, and to convert said common refocusing parameters in a rendering refocusing plane of a 3D reference system associated with said first plenoptic device.

14. The device according to claim 13, wherein said refocusing is recomputed when a distance between said rendering refocusing plane and a plane perpendicular to an optical axis of said first plenoptic device, exceeds a predetermined value.

15. The device according to claim 13, wherein the processor is further configured to:
determine of said at least one common point of interest by obtaining information representative of at least one point of interest associated with at least one plenoptic video data of interest capturing said scene and provided by a third plenoptic device;
use respectively at least one transformation between said common 3D reference system and at least one 3D reference system, associated with said third plenoptic device, for converting said information into said common 3D reference system; and
determine said common refocusing plane parameters from said information converted into said common 3D reference system.

16. The device according to claim 15, wherein said information is provided automatically by said third plenoptic device.

17. The device according to claim 15, wherein said information is:
representative of a single point of interest associated with a single plenoptic video data of interest; and
provided, through a user interface, associated with a device rendering one of said plenoptic video data capturing said scene.

18. The device according to claim 15, wherein said information is:
representative of at least two points of interest associated with at least one plenoptic video data of interest; and
provided, through at least one user interface, associated with at least one device rendering one of said at least one plenoptic video data of interest.

19. The device according to claim 11, wherein when at least two successive refocusings associated respectively with at least two rendering refocusing planes are performed at two distinct instants, said method comprises generating a sequence of frames whose respective focusing planes are located between said at least two rendering refocusing planes.

20. A non-transitory computer-readable storage medium storing program code instructions adapted to perform a method according to claim 1 when executed on a computer.

* * * * *